US006709587B1

(12) United States Patent
Guilmette (10) Patent No.: US 6,709,587 B1
(45) Date of Patent: Mar. 23, 2004

(54) METHOD AND DEVICE FOR COLLECTING A FLOATING LIQUID

(76) Inventor: Paul L. Guilmette, P.O. Box 13, Canton Center, CT (US) 06020

(*) Notice: Subject to any disclaimer, the term of this patent is extended or adjusted under 35 U.S.C. 154(b) by 44 days.

(21) Appl. No.: 10/236,137

(22) Filed: Sep. 6, 2002

(51) Int. Cl.[7] .............................................. E02B 15/04
(52) U.S. Cl. ............................... 210/242.3; 159/416.1; 159/776; 159/923
(58) Field of Search ................................. 210/158, 159, 210/170, 242.1, 242.3, 416.1, 747, 776, 923

(56) References Cited

U.S. PATENT DOCUMENTS

| | | | | |
|---|---|---|---|---|
| 3,745,115 A | * | 7/1973 | Olsen | 210/776 |
| 6,358,023 B1 | * | 3/2002 | Guilmette | 417/460 |
| 6,368,498 B1 | * | 4/2002 | Guilmette | 210/123 |
| 6,435,849 B1 | * | 8/2002 | Guilmette | 417/472 |
| 6,609,853 B1 | * | 8/2003 | Guilmette | 405/67 |

* cited by examiner

Primary Examiner—Robert J. Popovics (57) ABSTRACT

A collection device (10) or a recovery device (13) made up of several interconnected collection devices is usable in a method for collecting a floating liquid, e.g., oil, from the surface of a body of a first liquid, e.g., water. Recovery device (13) includes one or more collection devices (110, 210, 310, 410), each of which includes a flotation member (112, 212, 312, 412) having a first regulator frame (114, 214, 314, 414) connected to a receiving tray (118, 218, 318, 418) having a suction port (120, 220, 320, 420). The respective suction ports of the receiving trays are connected to one or more pumps (22, 22', 24, 24') which transport the collected floating liquid from the receiving trays to a collection conduit (34). A liquid separator (36) may be connected to the collection conduit (34) for receiving the collected liquids and separating them. The pumps may be operated by movement of the body of liquid on which the device (13) floats, such as the natural wave action of a body of water. A method of collecting the floating liquid utilizes the collection device (10) or recovery device (13) and may include operating the pumps (22, 22', 24, 24') by wave-induced relative movement of the individual collection devices (10, 110, 210, 310, 410).

15 Claims, 11 Drawing Sheets

METHOD AND DEVICE FOR COLLECTING A FLOATING LIQUID

BACKGROUND OF THE INVENTION

1. Field of the Invention

The present invention relates to a device which is suitable for use in collecting a floating liquid from the surface of a body of first liquid, such as the collecting of oil or other hydrocarbon liquid floating on the surface of a natural body of water.

2. Related Art

The art shows a number of devices for skimming oil from the surface of water. U.S. Pat. No. 3,704,784, issued to Craggs et al on Dec. 5, 1972 and entitled "Floating Oil Skimmer", discloses a floating oil skimmer (FIG. 1) having a center skimming unit 10 which is an elongated rectangular box-like structure having an open front to permit entry of oil and water into the unit. A hinged lip 60 regulates the depth, about 2 to 12 inches, of water admitted into skimming unit 10 and flowed to an oil collection sump 80 (FIG. 8) at the rear of the skimming unit 10 to collect oil and water. The collected oil and water overflows an adjustable weir 82 into a sump 80. The content of the sump is pumped to a suitable receiving tank on a work boat.

U.S. Pat. No. 4,381,994, issued to Ayers on May 3, 1983 and entitled "Spilled Oil Skimmer Kit", discloses a skimmer 2 (FIGS. 1 and 1A) having floats 20 (FIGS. 2 and 3) mounted on opposite sides of a frame 21 which holds the front of skimmer 2 open and in a position to receive incoming oil and water. The top 22 of skimmer 2 is maintained by flotation devices above water level, but not above the oil level. Water and oil which enters skimmer 2 proceeds to rear section 30 and the water exits at open bottom 26a of skimmer 2 and the oil remains at the top 22 of skimmer 2. The oil is then removed from skimmer 2 by suction.

U.S. Pat. No. 5,478,483, issued to Gore on Dec. 26, 1995 and entitled "Oil Spill Skimmer With Adjustable Floating Weir", discloses an oil recovery skimmer vessel 20 (FIG. 2) having waterjets 28 and 30 located at the front of vessel 20 which help direct oil toward the inlet end 32 of vessel 20. The vessel 20 has a first floating, hinged weir or attractor 36 and a second weir 46. Water, oil and debris flow over the first weir 36 and substantially only oil flows over the second weir 46 and into an oil sump 48. The oil is removed from oil sump 48 by a discharge pump 50.

U.S. Pat. No. 5,753,108, issued to Haynes et al on May 19, 1998 and entitled "Integrated Oil Response and Recovery System and Method and Skimmer For Use Therein", discloses a skimmer 38 having a frame 1 with two vertical sides, a collection channel 30, an optional auger type conveyor 31 and a moving conveyor 2, which cooperate to collect oil from the ocean's surface and deposit it in sump 5, from which the oil is drained via drain lines 24 into storage on a vessel 21.

SUMMARY OF THE INVENTION

Generally, the present invention provides a device for collecting and recovering a floating liquid, such as oil or other hydrocarbon liquid, from the surface of a body of a first liquid, such as water. Typically, the hydrocarbon liquid is a crude oil (or other hydrocarbon) spill on the surface of an ocean, lake, or river, either in the open sea, or within a harbor, port, river or the like. In certain embodiments, the collection devices of the present invention provide a receiving tray which floats on the surface of the first liquid, e.g., a body of water, within a spill of the floating liquid, e.g., an oil spill. The receiving tray is dimensioned and configured to have the floating liquid (and usually some of the first liquid) enter therein. A suction port is formed in the receiving tray and is connected in liquid flow communication to the suction inlet of a pump, which may be a conventionally-powered pump or, in some cases, an external-force pump (defined below). In the latter case, the pump may utilize energy provided by natural movement of the first liquid, e.g., ocean waves, river current or the like or by movement of the collection device by towing. In any case, such external-force pump is mounted on the receiving tray or otherwise on the collection device so as to be operated by movement of the first liquid relative to the device. Such movement may be natural movement, such as the natural wave action or current flow of a body of water, or may be induced, such as by towing the collection device. The pump thus acts to move collected floating liquid to storage or treatment via an outlet conduit or the like connected to the discharge of the pump. A plurality of the collection devices may be connected to such pumps and may be used in such numbers as to provide a breakwater for a harbor, by taking up wave energy while simultaneously collecting floating contaminant liquids ranging from large oil spills to the day-to-day leakage and spillage of fuels and lubricants which is unavoidable in a busy harbor or passage.

In certain other embodiments, the devices of the present invention may generally comprise an outer flotation member within which is disposed at least one regulator frame and the receiving tray. The floating liquid, usually combined with the first liquid, is collected within the receiving tray and then is pumped to storage or other disposal. The components may be connected to each other by gimbal mounts to stabilize the receiving tray to enhance the ability of the receiving tray to contact wave troughs for flow of liquid into the receiving tray and thence to the suction port.

Specifically, in accordance with the present invention there is provided a first collection device capable of collecting a floating liquid from the surface of a body of a first liquid on which the floating liquid floats, the first collection device being dimensioned and configured to float at the surface of the first liquid and comprising the following components. A first receiving tray has a suction port therein, and at least one pump having a suction inlet and a discharge outlet, the suction inlet of the pump being connected in liquid flow communication to the suction port of the first receiving tray for removing collected liquid from the receiving tray. The pump has first and second actuator members and is dimensioned and configured to be operated by repeated mechanical compression and relaxation of the pump by forces imposed on the actuator members. The pump is connected by its first actuator member to the receiving tray and its second actuator member is connected to a separate structure, for example, a second collection device comprising a receiving tray and at least one pump as described above, relative to which the receiving tray is movable. In this way, repeated relative movement between the receiving tray and the structure operates the pump to pump liquid from the suction port of the receiving tray to the discharge outlet of the pump.

Other aspects of the present invention provide one or more of the following features. The collection device may further comprise a body member to which the receiving tray is connected; the body member may comprise a frame-like structure within which the receiving tray is received; the body member may comprise a flotation member; when the separate structure is a second collection device as described above, the second collection device may further comprise a second body member to which a second receiving tray is connected; and the collection device may further comprise a first regulator frame connected to the body member.

Another aspect of the present invention provides a recovery device comprising a plurality of the collection devices described above and wherein the second actuator member of at least some of the pumps is connected to another one of the collection devices.

In accordance with yet another aspect of the present invention, there is provided a collection device having a longitudinal axis and a transverse axis and capable of collecting a floating liquid from the surface of a body of a first liquid on which the floating liquid floats, the collection device being dimensioned and configured to float at the surface of the first liquid. The collection device comprises (1) a body member; (2) a first regulator frame connected to the body member by a first set of gimbal mounts for pivoting movement of the frame about the longitudinal axis of the body member; and (3) a receiving tray having a suction port therein and connected to the regulator frame by a second set of gimbal mounts for pivoting movement of the receiving tray about the transverse axis of the body member, the suction port being connectable to a pump for withdrawing collected liquid from the tray. In this way, pivoting of the receiving tray relative to the body member induced by movement of the collection device on the body of the first liquid enhances the ability of the receiving tray to contact wave troughs for flow into the receiving tray, and thence to the suction port, of at least the floating liquid.

Yet another aspect of the present invention provides a recovery device having a longitudinal axis and a transverse axis and being capable of collecting and recovering a floating liquid from the surface of a body of a first liquid on which the recovery device floats. The recovery device comprises one or more collection devices as described above, and one or more pumps having a suction inlet and a discharge outlet, with the suction inlet connected in liquid flow communication to the suction port of the at least one collection device for removing collected liquid from the recovery device.

Other aspects of the present invention provide one or more of the following features: the recovery device may comprise a plurality of the collection devices connected to respective ones of a plurality of pumps having respective discharge outlets; the discharge outlet of the one or more pumps may be connected to at least one discharge conduit; the recovery device may further comprise a liquid separator connected in liquid flow communication to the at least one collection conduit for receiving the first and second immiscible liquids collected from the recovery device, and separating the collected first and second liquids; the liquid separator may be dimensioned and configured to separate oil from water and the body member may comprise a flotation member which is dimensioned and configured to float on the surface of water within an oil slick on the surface of the water, and the one or more pumps may be dimensioned and configured to be operated by repeated mechanical compression and relaxation of the pumps, the pumps having first and second actuator means, e.g., opposite ends of the pump, with one actuator means of a pump connected to a first collection device which is movable relative to a movable or fixed structure, e.g., a second collection device or a drilling rig, to which the other actuator means of the same pump is connected. In this way, repeated relative movement between the first collection device and the structure operates the pump.

The movement of the recovery device may be caused by wave action of the body of the first liquid, by a flowing current of the body of the first liquid, or, if the structure is movable, by towing at least one collection or recovery device with a vessel over the body of the first liquid.

Yet another aspect of the present invention provides for an intermediate regulator frame to be connected between the first regulator frame and the receiving tray by a first intermediate set of gimbal mounts for pivoting movement of the intermediate regulator frame about the transverse axis of the flotation member.

One aspect of the present invention provides for the first intermediate set of gimbal mounts to be located either at or off-set from the midpoint line of the intermediate regulator frame.

Another aspect of the present invention provides a protective grille carried on the device, which grille is dimensioned and configured to block debris from entering into the suction port, e.g., the protective grille may be dimensioned and configured to block debris from entering into the receiving tray. In a related aspect, the protective grille may be comprised of a plurality of substantially parallel linearly extending members, e.g., rods or the like, whereby a rake may be drawn across the grille to clear therefrom debris accumulated thereon.

A method aspect of the present invention provides a method for collecting a floating liquid from the surface of a body of a moving first liquid on which the floating liquid floats, by utilizing one or more collection devices, each of which comprises (a) a receiving tray having a suction port therein, and (b) at least one pump having a suction inlet and a discharge outlet. The suction inlet is connected in liquid flow communication to the suction port of the receiving tray for removing collected liquid from the receiving tray, and the collection device is dimensioned and configured to float on the surface of the moving first liquid and to admit at least the floating liquid into the receiving tray and its suction port by movement of the first liquid. The method comprises placing the collection device on the surface of the moving first liquid to use the movement of the first liquid for collecting the floating liquid in the receiving tray, and pumping liquid from the suction port of the receiving tray to the discharge outlet of the pump.

In one method aspect of the invention, the pump is an external-force pump and the pumping is carried out by imposing repeated mechanical compression and relaxation on the pump by movement of the first liquid.

In another method aspect of the invention, the pump is an external-force pump, and the method further comprises mechanically connecting the pump between the collection device and a separate structure, e.g., another collection device, thereby pumping the liquid by utilizing repeated relative movement imposed between the collection device and the separate structure by movement of the first liquid to operate the pump.

Yet another method aspect of the present invention provides a method for collecting a floating liquid from the surface of a body of a moving first liquid on which the floating liquid floats by utilizing a plurality of collection devices mechanically interconnected by external-force pumps, the collection devices each comprising (a) a receiving tray having a suction port therein, and (b) one or more pumps having respective suction inlets and discharge outlets, the suction inlets being connected in liquid flow communication to the respective suction ports of the receiving trays for removing collected liquid from the receiving trays, the collection devices being dimensioned and configured to float at the surface of the moving first liquid and to admit at least the floating liquid into respective ones of the receiving trays and their associated suction ports. In this aspect, the method comprises placing the collection devices on the surface of the first liquid and imposing repeated mechanical compression and relaxation on the pumps by movement of the first liquid thereby to pump liquid from the respective suction ports of the receiving trays to the respective discharge outlets of the pumps.

Other aspects of the invention are as described in the following description and the appended drawings.

As used herein and in the claims, the term "external-force pump" means a pump which is operated by externally-imposed mechanical forces imposed on the pump, and excludes pumps operated by electric motors, internal or external combustion engines, steam or the like. Examples of "external-force pumps" usable in the present invention are those described below and more fully disclosed in U.S. Pat. No. 6,358,023 ("Moment Pump") and U.S. Pat. No. 6,435,849 ("Fluid Pump"), both issued to Paul L. Guilmette. Manually-operated pumps would be another example of "external-force pumps".

DETAILED DESCRIPTION OF THE INVENTION AND PREFERRED EMBODIMENTS THEREOF

Figure 1:
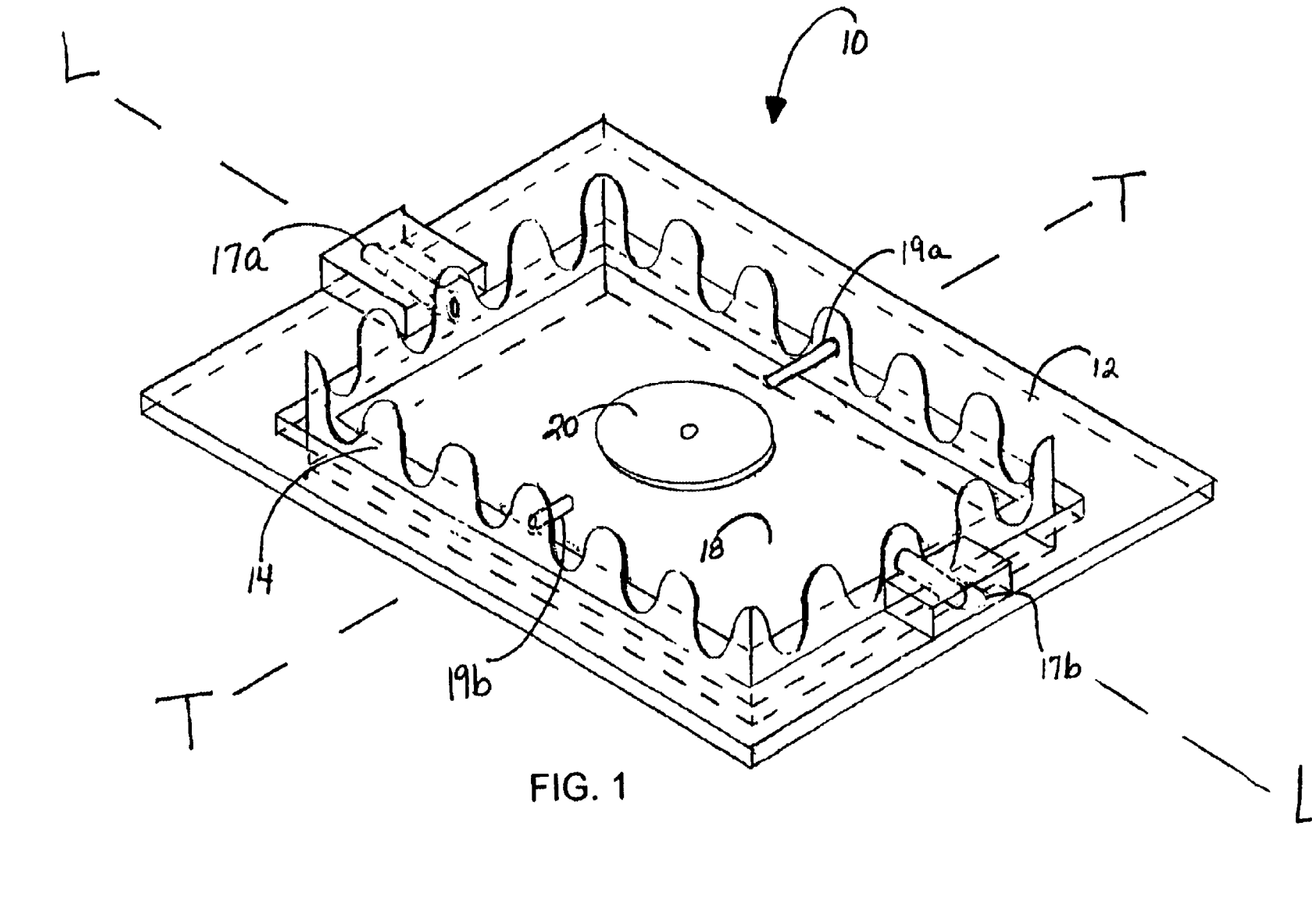
FIG. 1 is a perspective view of a collection device in accordance with one embodiment of the present invention.
Figure 2:
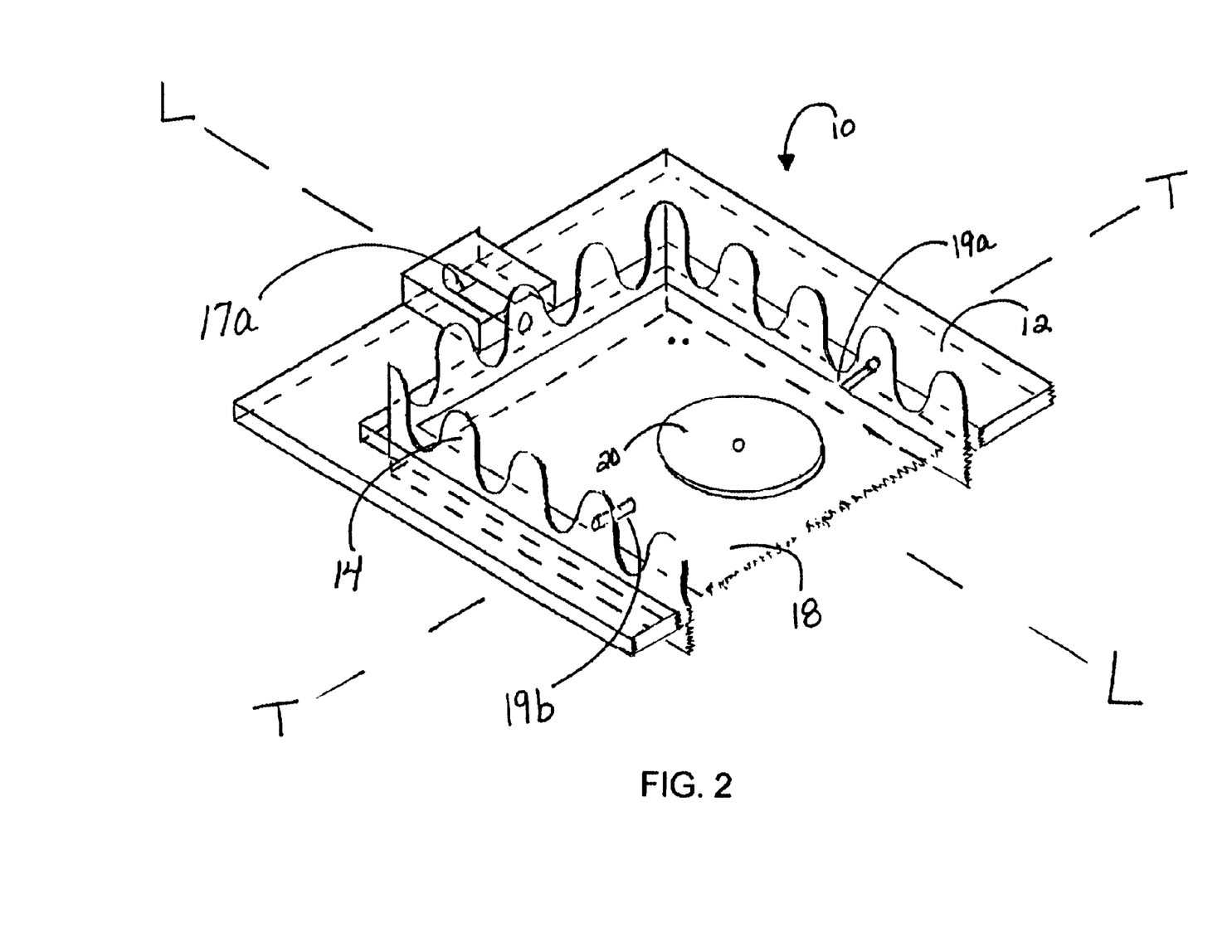
FIG. 2 is a view of the collection device of FIG. 1 with a part thereof broken away in order to show the relative position of the components thereof.
Figure 3:
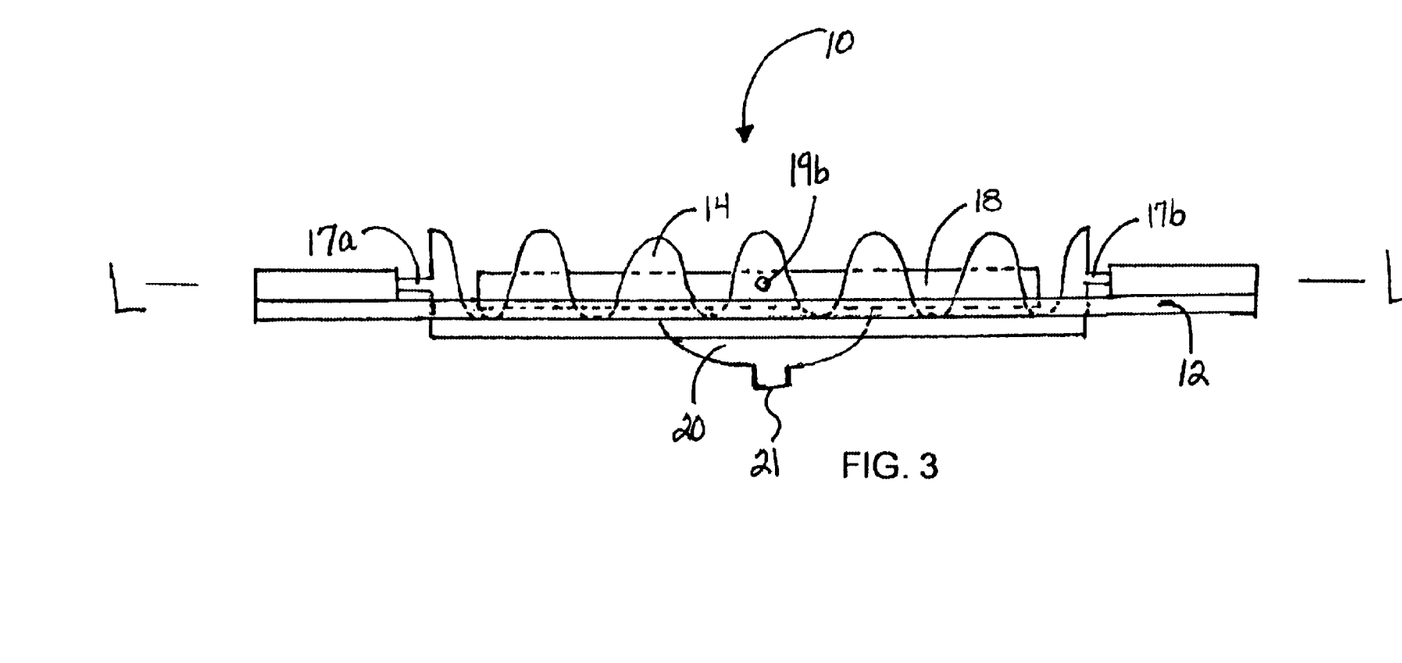
FIG. 3 is a front view of the collection device of FIG. 1.

Referring now to FIGS. 1, 2 and 3, there is shown a collection device 10 in accordance with one embodiment of the present invention. Collection device 10 has a longitudinal axis L-L and a transverse axis T-T, and is constructed so that it will float upon a body of liquid, e.g., water. The collection device 10 comprises a flotation member 12 of generally rectangular frame-like configuration, i.e., flotation member 12 has a generally rectangular cut-out in it, which cut-out is dimensioned and configured to receive therein a first regulator frame 14, which is also of generally rectangular configuration.

Flotation member 12 is dimensioned and configured, and is of a density, so that it enables collection device 10 to float upon a body of a first liquid, usually water, whether fresh water or ocean salt water. Accordingly, in case the second liquid, e.g., oil or other hydrocarbon liquid floating on the surface of the body of the first liquid, e.g., on the ocean or a lake or river, is of significant depth, the flotation member will sink through the second liquid and float upon the body of the first liquid.

First regulator frame 14 is pivotably attached to flotation member 12 by first gimbal mounts 17a, 17b. (Only gimbal mount 17a is visible in FIG. 2.) First gimbal mounts 17a, 17b are aligned along the longitudinal midpoint line of first regulator frame 14, that mid-point line coinciding with longitudinal axis L-L shown in FIG. 1. This alignment of first gimbal mounts 17a, 17b at the longitudinal midpoint line balances first regulator frame 14 on first gimbal mounts 17a, 17b while allowing for pivoting movement of first regulator frame 14 about gimbal mounts 17a, 17b.

A receiving tray 18 having a suction port 20 is pivotably connected to the first regulator frame 14 by second gimbal mounts 19a, 19b. The first regulator frame 14 is configured as a crenellated peripheral wall which encircles the entire periphery of receiving tray 18, and is dimensioned and configured to fit within a body member which, in this illustrated embodiment, comprises a flotation member 12. Like flotation member 12, first regulator frame 14 has a generally rectangular cut-out in it, which cut-out is dimensioned and configured to receive the receiving tray 18 within first regulator frame 14.

First regulator frame 14 may be crenellated or perforated or otherwise configured about its entire periphery to control the amount of liquid which flows over or through it and into the receiving tray 18, and to help prevent the entry of debris into receiving tray 18 where such debris could block suction port 20.

Receiving tray 18 is of generally rectangular configuration and is dimensioned and configured to fit within the first regulator frame 14. The receiving tray 18 is connected to first regulator frame 14 by second gimbal mounts 19a, 19b, which are aligned along the transverse midpoint line of receiving tray 18, which coincides with transverse axis T-T of collection device 10. This alignment of second gimbal mounts 19a, 19b at the transverse midpoint line of receiving tray 18 balances receiving tray 18 on second gimbal mounts 19a, 19b while allowing for pivoting movement of receiving tray 18 about the transverse axis T-T of collection device 10. The suction port 20 is positioned in the center of receiving tray 18 and is dimensioned and configured to be connected by an input line to a pump for pumping liquid therein from receiving tray 18 to storage or disposal.

It is seen that flotation member 12, first regulator flame 14, and receiving tray 18 comprise a gimballed device, i.e., a device with two mutually perpendicular and intersecting axes of rotation. This arrangement gives free angular movement in two direction and provides a stabilizing and damping effect, thereby permitting collection device 10 to skim the floating second liquid, e.g., oil, from the surface of a body of the first liquid, e.g., water, even from the troughs of waves.

As seen in FIG. 3, the bottom of suction port 20 of receiving tray 18 extends downwardly below the bottom of first regulator frame 14 and terminates in a discharge port 21.

Figure 4:
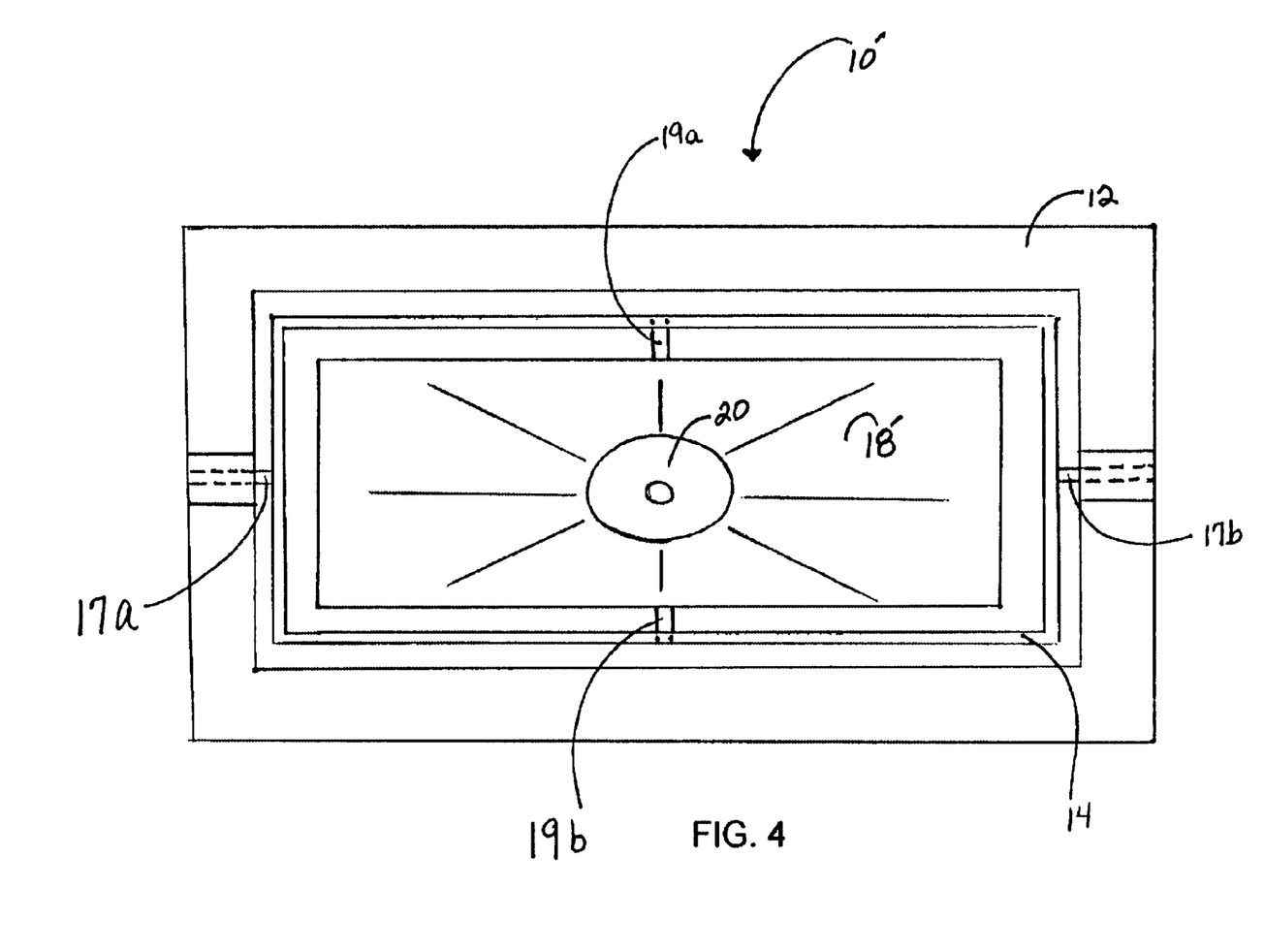
FIG. 4 is a top view of the collection device of FIG. 1.

FIG. 4 illustrates another embodiment of the present invention, which is substantially the same as the collection device 10 of FIGS. 1 and 2, except that the receiving tray 18' of collection device 10' has a configuration wherein the base of receiving tray 18' inclines downwardly toward suction port 20 so as to enhance the flow of liquid from the edges of the receiving tray 18' into suction port 20. In FIG. 4, parts which are identical to those of FIGS. 1, 2 and 3 are numbered identically to the parts of those Figures, and are not further described.

Figure 5:
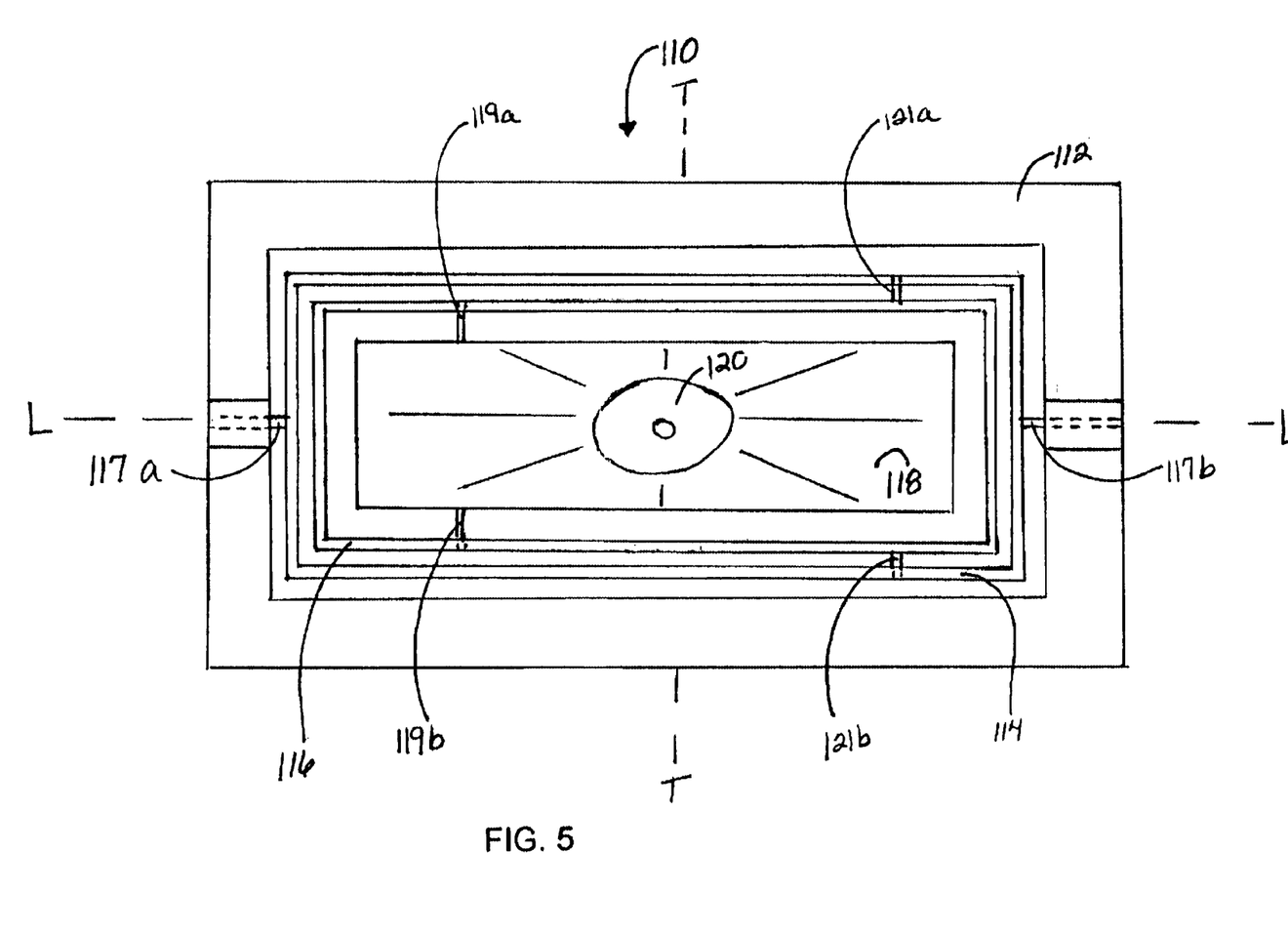
FIG. 5 is a top view of a collection device in accordance with another embodiment of the present invention.

Referring now to FIG. 5, there is shown a collection device 110 in accordance with another embodiment of the present invention, collection device 110 having a longitudinal axis L-L and a transverse axis T-T. The collection device 110 comprises a flotation member 112 of generally rectangular configuration with a first regulator frame 114 attached thereto by a first set of gimbal mounts 117a, 117b, an intermediate regulator frame 116 attached to first regulator frame 114 by a first intermediate set of gimbal mounts 121a, 121b, and a receiving tray 118 having a suction port 120, and attached to the intermediate regulator frame 116 by a second intermediate set of gimbal mounts 119a, 119b. The flotation member 112 is dimensioned and configured to enable collection device 110 to float upon a body of a first liquid, i.e., salt or fresh water. The first regulator frame 114 is of generally rectangular configuration and is dimensioned and configured to fit within flotation member 112 and to support the intermediate regulator frame 116 thereon. First set of gimbal mounts 117a, 117b are aligned along the longitudinal midpoint line of first regulator frame 114, which allows for pivoting movement of first regulator frame 114 about the longitudinal axis L-L of flotation member 112. The intermediate regulator frame 116, being of a generally rectangular configuration, is dimensioned and configured to fit within first regulator frame 114 and to support the receiving tray 118. Receiving tray 118 contains a suction port 120 and is dimensioned and configured to fit within intermediate regulator frame 116. The first intermediate set of gimbal mounts 121a and 121b is located off-set (to the right as viewed in FIG. 5) of transverse axis T-T of collection device 110, and the second intermediate set of gimbal mounts 119a, 119b is aligned with transverse axis T-T, i.e., is at the transverse center line of collection device 110. This off-set positioning of first intermediate gimbal mounts 121a, 121b allows for a scissors-like pivoting movement of intermediate regulator frame 116 as described below in connection with FIG. 5A. As with the embodiment of FIGS. 1–3, the gimbaled construction of collection device 110 allows for pivoting movement of receiving tray 118 about the transverse axis T-T of flotation member 112. The suction port 120 is positioned in the center of receiving tray 118 and is dimensioned and configured to be connected to a pump for receiving liquid therein to be transported to a discharge conduit.

Figure 5A:
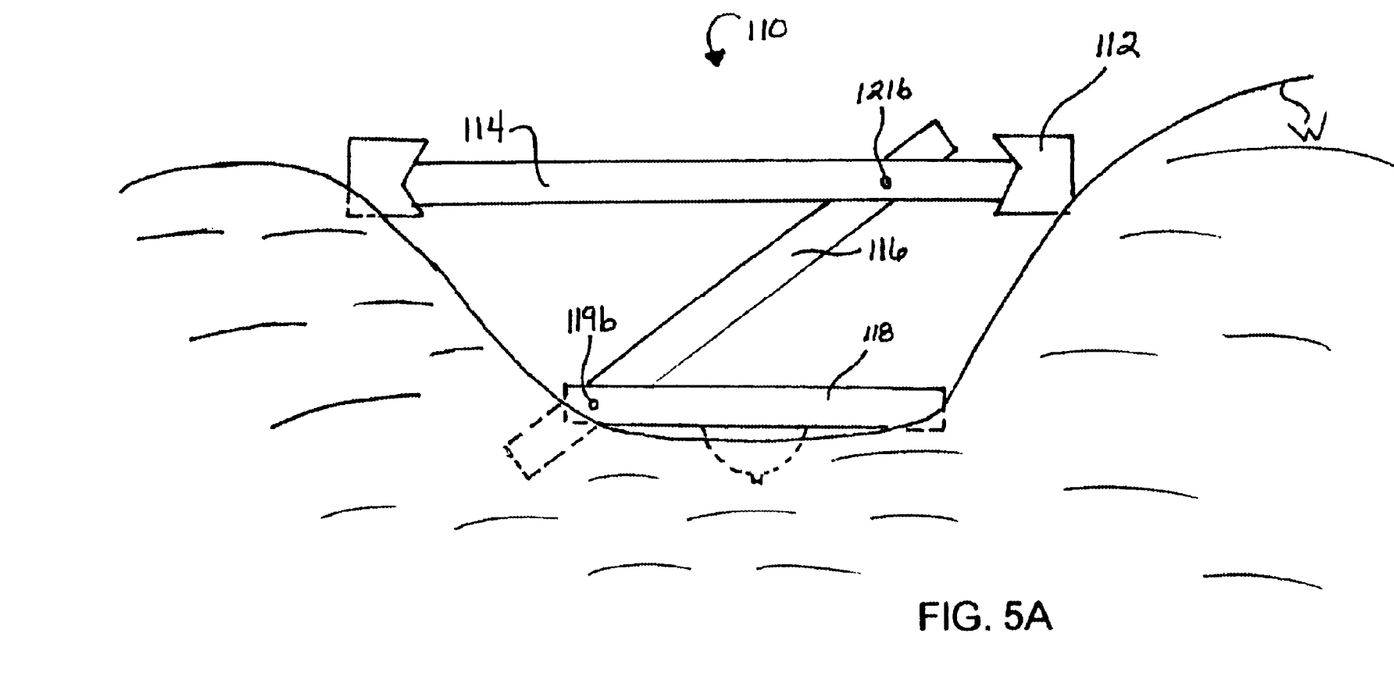
FIG. 5A is a side view of the inner components of the collection device of FIG. 5.

FIG. 5A illustrates the collection device 110 of FIG. 5 with most of flotation member 112 broken away to show the first regulator frame 114 is in a relatively horizontal position, the intermediate regulator frame 116, having pivoted upon first intermediate gimbal mounts 121a, 121b to open scissors-like into the trough of a wave in water W. (Only gimbal mount 121b is visible in FIG. 5A.) One end of intermediate regulator frame 116 thus extends downwardly below the first regulator frame 114, and the receiving tray 118, having pivoted upon second intermediate gimbal mounts 119a, 119b about the transverse axis T-T of flotation member 112, is maintained substantially, or close to, a horizontal position. (Only gimbal mount 119b is visible in FIG. 5A.) The scissors-like or telescoping effect provides greater stability of receiving tray 118 during periods when the first body of liquid, e.g., water W, is undergoing severe agitation, e.g., the surface of a body of water during significant wave activity. This stability is achieved by "dropping" receiving tray 118 into the trough of the wave.

Figure 6:
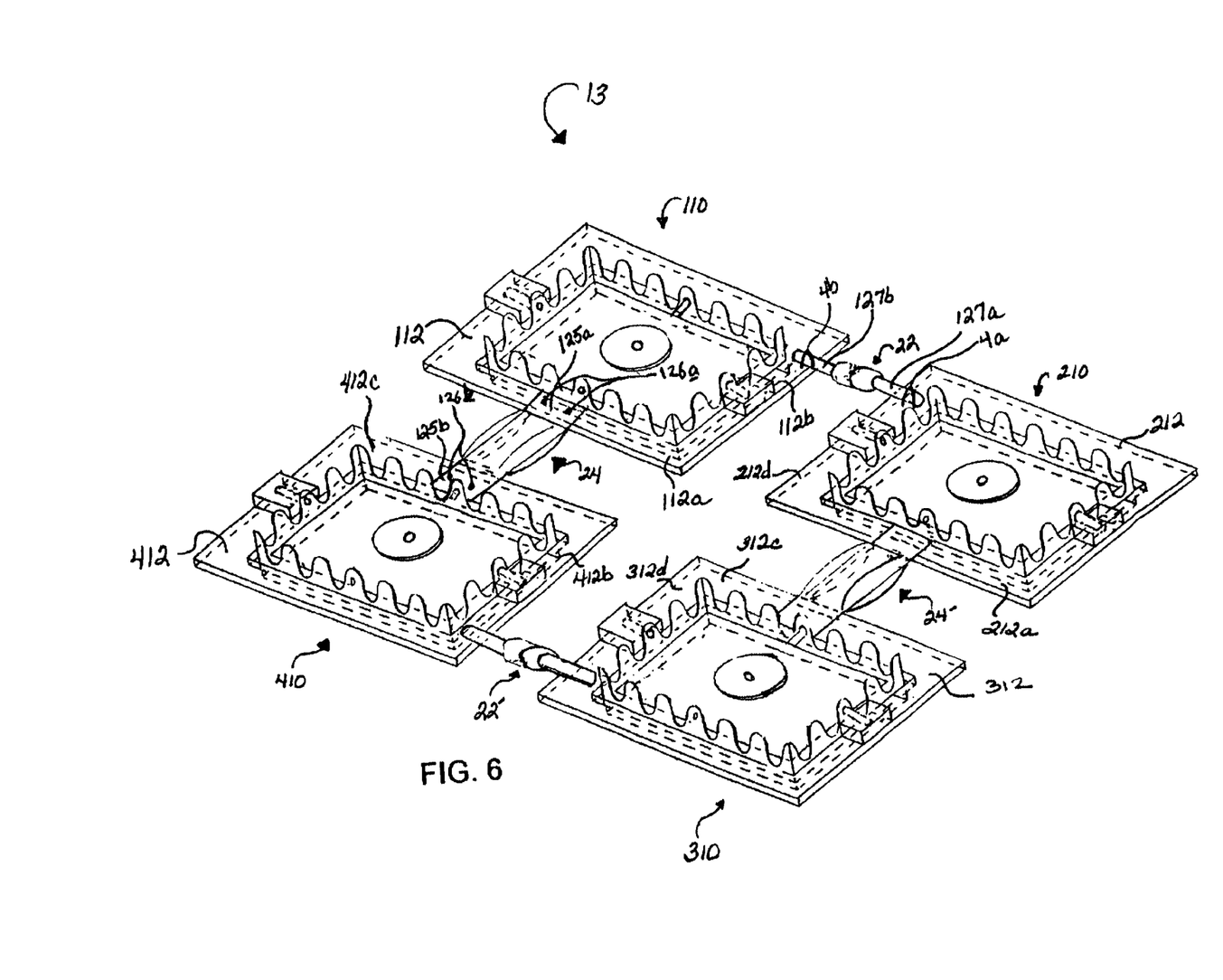
FIG. 6 is a perspective view of an assembly of four of the collection devices of FIG. 1 interconnected by moment and fluid pumps.

Referring now to FIG. 6, there is shown a schematic view of an assembly of four collection devices 110, 210, 310 and 410, each of which is identical or similar to collection device 10 of FIGS. 1, 2 and 3. A description of the individual components of collection devices 110, 210, 310 and 410 is therefore not necessary. The four collection devices 110, 210, 310 and 410 are mechanically interconnected to pumps and are connected in liquid flow relationship by suction and discharge lines to a collection conduit, all as described below. The interconnected four collection devices are arranged to provide a recovery device 13. For clarity of illustration, the suction and discharge lines, the collection conduit and other components are omitted from FIG. 6 and shown schematically in FIG. 6A. The collection devices 110, 210, 310 and 410 are arranged in the general shape of a square wherein each collection device is mechanically connected by two of the pumps to two other of the collection devices. The collection devices are also connected in liquid flow communication as described in more detail below to the respective inlets of a moment pump 22 or 22', and the respective inlets of a fluid pump 24 or 24'. Moment pumps 22 and 22' and fluid pumps 24 and 24' are external-force pumps as defined above (in the last paragraph of the "Summary of the Invention" section). That is, these pumps are operated by mechanical forces externally imposed on them, in this case, by relative movement of the individual collection devices 110, 210, 310 and 410. It should be noted that while such external-force pumps are preferred because of their independence of a source of, e.g., electrical power, and their lower cost and simplified construction as compared to conventionally-powered pumps, some aspects of the present invention may employ such conventionally-powered pumps in lieu of the external-force pumps described herein.

Fluid pump 24 has first and second actuator members 125a, 125b which, in the illustrated embodiment, merely comprise respective opposite ends of the flexure plate (described below) of fluid pump 24. First actuator member 125a is fastened to collector device 110 and second actuator member 125b is fastened to collector device 410. While the actuator members may be secured to their respective collector devices by any suitable means, mechanical fasteners such as bolts and nuts, shackles, clamps or the like, which provide high-strength connections, but which are removable for disassembly or to permit repair and replacement of parts, are preferred. In the illustrated embodiment, pairs of bolts 126a, 126b are shown connecting actuator member 125a to flotation member 112 and actuator member 125b to flotation member 412 whereby to secure fluid pump 24 between collection device 110 and collection device 410. Fluid pump 24' is similarly secured between collection devices 210 and 310. In this way, relative movement of collection devices 110/410 and 210/310 will flex fluid pumps 24 and 24', respectively, to operate the pumps as described below.

Similarly, a moment pump 22 is fastened mechanically by any suitable means between collection devices 110 and 210. In the illustrated embodiment, moment pump 22 has first and second actuator members 127a and 127b. A pair of U-bolt clamps 4a, 4b respectively secure actuator member 127a to collection device 210 at flotation member 212 thereof, and actuator member 127b to collection device 110 at flotation member 112 thereof. Moment pump 22 is thus mechanically connected between collection devices 110 and 210. Moment pump 22' is similarly connected between collection devices 310 and 410. Relative movement of collection devices 110/210 and 310/410 will manipulate moment pumps 22 and 22', respectively, to operate them as described below. It will be understood that any suitable type of pump can be used, but it is preferred to use pumps which are operated by relative movement between the collection devices, or between a collection device and a separate structure, most preferably by pumps operated solely by such relative movement. By so doing, the need to supply power to the pumps of recovery device 13 is eliminated and all the power needed may be supplied by natural movement (wave action, current flow, etc.) of the water on which recovery device 13 floats. Pumps such as moment pumps 22, 22' and fluid pumps 24, 24', which are operated by such relative movement are inherently flexible or compressible/expandable so that they do not create a fixed, rigid connection between two collection devices or a collection device and a separate structure, thereby permitting the relative movement which operates such pumps. The separate structure may be a boat, a raft, another collection device or other floating structure, or it may be a fixed structure such as a pier, a leg of a drilling platform or the like.

It is not necessary to combine fluid pumps 24, 24' and moment pumps 22, 22' in the combination shown in FIG. 6 and, as described below, in FIG. 6A. These Figures are merely illustrative. All four pumps could be either moment pumps or fluid pumps, or three of one type and one of another type may be used, or, as noted above, different types of pumps may be used in any suitable combination. The moment pumps 22, 22' could also be connected to their respective collection devices at the mid-points of the sides thereof, as is the case with fluid pumps 24, 24', or the latter could be offset from the collection device center lines.

In any case, as illustrated in FIG. 6, side 112a flotation member 112 of collection device 110 is connected to one end of fluid pump 24 and side 112b is connected to one end of moment pump 22. A side 212d of flotation member 212 is connected to the opposite end of moment pump 22 and side 212a of flotation member 212 is connected to one end of fluid pump 24'. Side 312c of flotation member 312 of collection device 310 is connected to the opposite end of fluid pump 24' and side 312d of flotation member 312 is connected to one end of moment pump 22'. Side 412b of flotation member 412 of collection device 410 is connected to the opposite end of moment pump 22' and side 412c of flotation device 412 is connected to the end of fluid pump 24, opposite the end thereof which is connected to flotation member 12 of collection device 110.

It will be appreciated that in other embodiments, one end of a pump such as moment pump 22 or 22' or fluid pump 24 or 24' could be connected to a collection device such as collection device 110, and the other end of the pump could be connected to a separate structure, which may be a floating structure such as a boat or a raft, or a stationary structure such as a drilling rig or pier. Movement of the collection device floating on the water would manipulate an external-force pump by relative movement between the collection device and the separate structure.

Figure 6A:
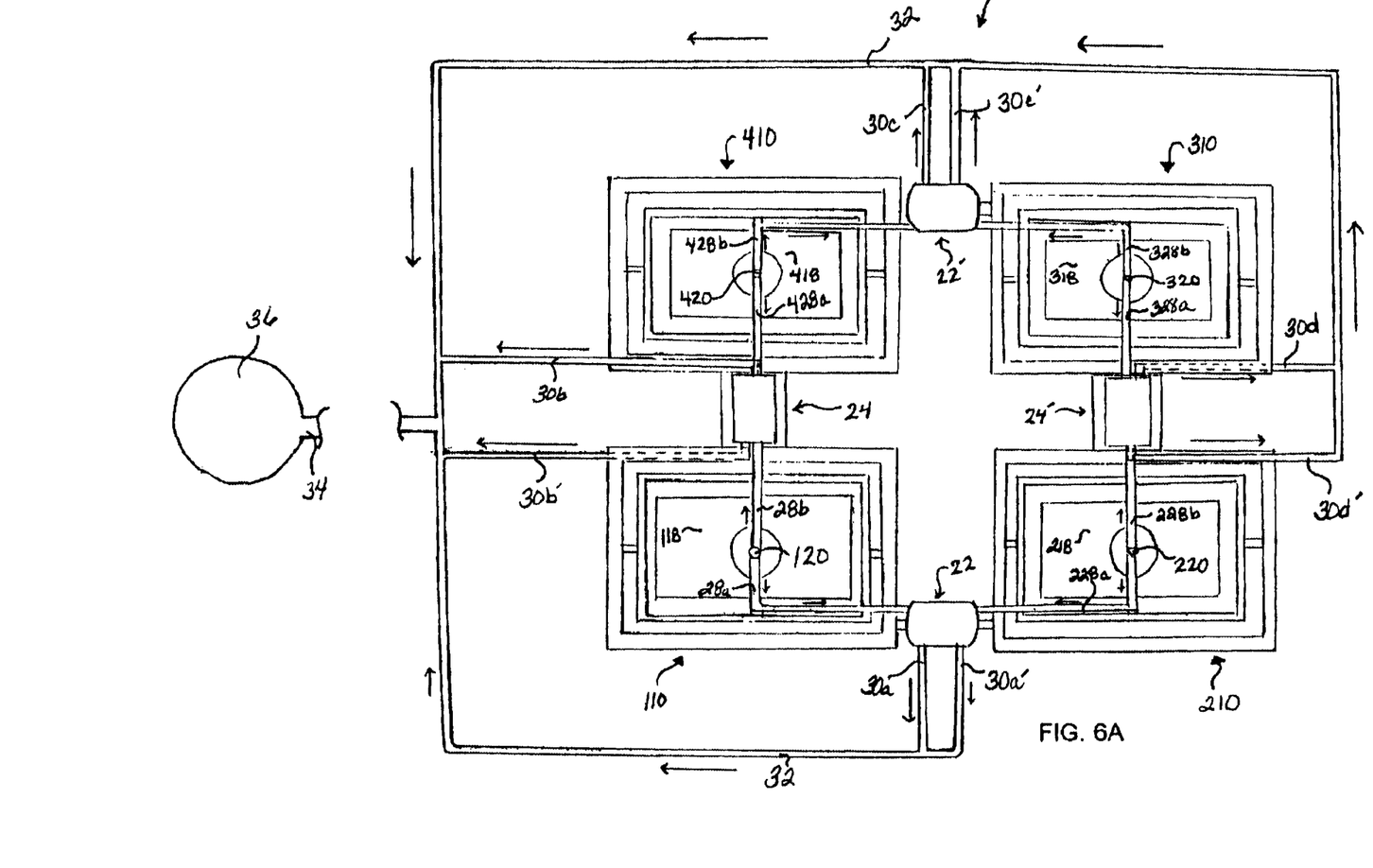
FIG. 6A is a schematic bottom view of the assembly of FIG. 6 as seen looking up from beneath it.

In FIG. 6A there is shown the gimbaled liquid recovery device 13 as seen from below, i.e., from beneath the surface of the first body of liquid on which it is floating. Suction lines 28b and 428a serve to transfer collected liquid (e.g., oil and water collected from an oil spill) from, respectively, suction port 120 of receiving tray 118 and suction port 420 of receiving tray 418 to the inlet of fluid pump 24, as indicated by the unnumbered arrows in FIG. 6A. Similarly, suction lines 228b and 328a serve to transfer collected liquid from, respectively, suction port 220 of receiving tray 218 and suction port 320 of receiving tray 318 to the inlet of fluid pump 24'. The unnumbered arrows in FIG. 6A show the direction of fluid flow in the lines and conduits with which they are associated. The collected liquids are pumped by fluid pump 24 via discharge lines 30b and 30b' to transfer line 32 thence to collection conduit 34, from which the collected liquids flow to a separator 36. In separator 36, immiscible liquids, e.g., oil and water, are separated and the separated liquids are sent to respective storage containers, to disposal or to further treatment (not shown).

Similarly, collected liquids from collection devices 110, 210, 310 and 410 are sent via, respectively, suction lines 28a and 228a to the inlet of moment pump 22; suction lines 328a, 228b to the inlets of fluid pump 24'; and suction lines 428b and 328b to moment pump 22'. Discharge lines 30a, 30a' transfer pumped liquids from moment pump 22 to transfer line 32; discharge lines 30c and 30c' similarly flow liquids discharged from moment pump 22' to transfer line 32; and discharge lines 30d, 30d' flow the liquids from fluid pump 24' to transfer line 32. Transfer line 32 in all cases conducts the pumped liquids to collection conduit 34.

Figure 7:
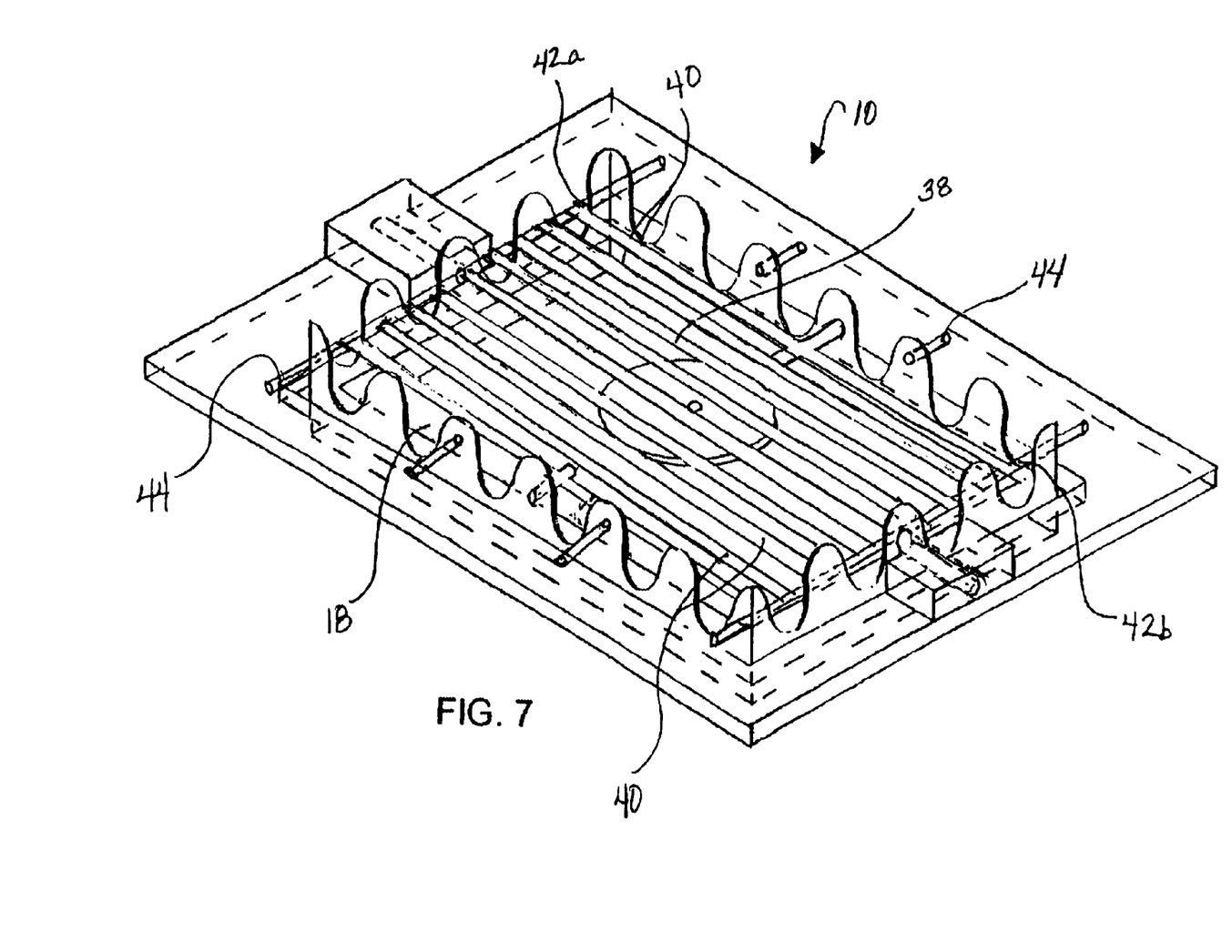
FIG. 7 is a perspective view of the collection device of FIG. 1 fitted with a protective grille.

FIG. 7 shows collection device 10 of FIG. 1 equipped with a protective grille 38 supported on receiving tray 18. Protective grille 38 is comprised of a plurality of substantially parallel longitudinally extending members comprised, in the illustrated embodiment, of rods 40. First and second end supports 42a, 42b are disposed perpendicularly to the longitudinal axes of rods 40 and support the latter at the ends thereof. The parallel construction of rods 40 facilitates cleaning debris, such as seaweed or the like, retained on protective grille 38 by use of a rake or similar tool. That is, a rake or similar tool can be drawn across protective grille 38 in a direction parallel to the longitudinal axes of rods 40.

A plurality of extension fingers 44 extend outwardly of protective grille 38, and serve to reduce the amount of debris which accumulates on protective grille 38 by fending off debris such as seaweed and the like.

Figure 8:
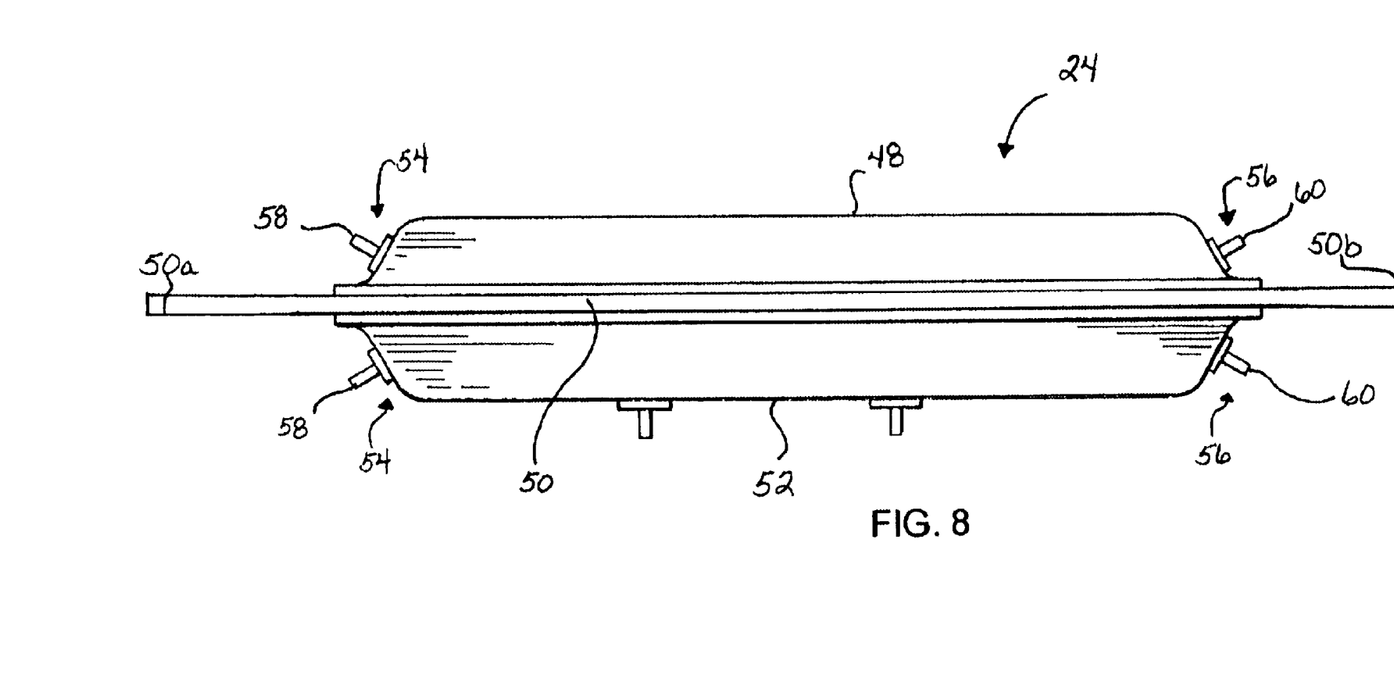
FIG. 8 is a side view of a fluid pump.

A suitable fluid pump such as fluid pumps 24 and 24' for use in connection with the present invention is disclosed in application Ser. No. 09/663,177, now U.S. Pat. No. 6,435, 849, of Paul L. Guilmette for "Fluid Pump", the disclosure of which is hereby incorporated herein by reference. Referring now to FIG. 8, a typical fluid pump 24 includes at least one flexible bladder, a top bladder 48 mounted on a top side of a flexure plate 50 for pumping fluid by compression and expansion of the bladder in an alternating manner. A bottom bladder 52 is mounted on the opposite side of flexure plate 50. Each bladder has at least one fluid input connector 54 with, optimally, a one-way valve 58 therein and has at least one fluid output connector 56 with optionally, a one-way valve 60 therein in order to provide one-way flow of fluid through each of the bladders 48 and 52. The bladders 48 and 52, made of a flexible material, may be rectangular, cylindrical or other shape and are therefore preformed and biased to that preformed shape. The flexure plate 50 may be made of a rubber-type material, plastic or metal. The flexure plate 50 must be dimensioned and configured so as to bend in an undulating manner when acted upon by a natural driving force. In the practices of this invention, one end 50a of flexure plate 50 may serve as a first actuator means and be connected to a collection device of the present invention, and the other end 50b may serve as a second actuator means and be connected to a second collection device of the present invention or to a fixed structure relative to which the first collection devices moves. Wave action in an ocean environment is one natural driving force; the fluid pump 24 may be placed in other environments where bending of the flexure plate 50 occurs, such as rivers, etc., or by towing the collection device. In any case, the repetitive drive force, however initiated, causes the flexure plate to repeatedly bend and recover, which repetitively compresses and expands the bladder to pump fluid. When the fluid pump is located in a body of liquid undergoing wave action or similar agitation, the surging liquid imposes the repetitive driving force on the fluid pump, thereby causing the pump to operate.

A suitable moment pump such as moment pumps 22 and 22' is disclosed in U.S. Pat. No. 6,358,023 of Paul L. Guilmette, issued on Mar. 19, 2002 on application Ser. No. 09/643,924, and entitled "Moment Pump". The disclosure of U.S. Pat. No. 6,358,023 is hereby incorporated herein by reference.

Figure 9:
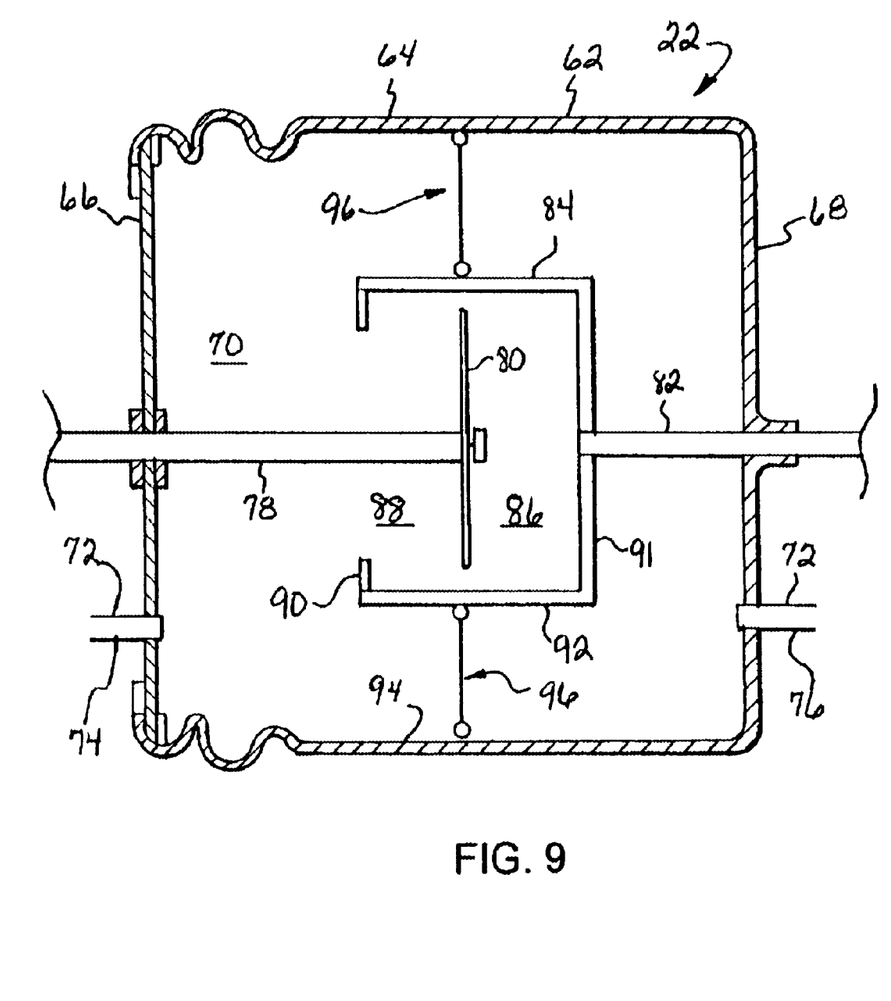
FIG. 9 is a longitudinal cross section of a moment pump.

Referring now to FIG. 9, a moment pump 22, in accordance with the teachings of U.S. Pat. No. 6,358,023, comprises a container 62 having an outer wall 64 and two opposing end walls 66, 68 attached thereto which define an interior chamber 70. The container 62 is made of a resilient material and has a preformed, cylindrical shape as shown when not being biased by forces acting on it. A pair of one-way valves 72 is attached to an input fluid connector 74 and an output fluid connector 76 in the container 62. A first actuator rod 78 has fixedly attached on one end a restraining member 80 and, on the other end, is connectable to a first biasing object (not shown). The first end wall 66 is fixedly attached to the first actuator rod 78 between the biasing object (not shown) and the restraining member 80. A second actuator rod 82 is connectable at one end to a second biasing object (not shown) and, on the other end, is attached to the second end wall 91 of a transfer housing 84. For use in connection with the present invention, the first biasing object may be a first collection device of the present invention and the second biasing object may be a second collection device of the present invention or a fixed structure relative to which the first collection device moves. The second actuator rod 82 slidably passes through the second end wall 68 of the flexible container 62 in a sealed manner.

The transfer housing 84 has an interior chamber 86 into which the longitudinal restraining member 80 of the first actuator rod 78 travels in confinement, not being able to leave the interior chamber 86. The transfer housing 84 is cylindrically shaped about the interior chamber 86 and has an aperture 88 in a first end wall 90 of the transfer housing 84 into which the first actuator rod 78 enters.

Attached between an exterior wall 92 of the transfer housing 84 and an inner surface 94 of the outer wall 64 of the container 62 is a plurality of biasing tension actuators 96. The tension actuators 96 are mounted in a non-slack manner between the container 62 and the transfer housing 84. The tension actuators 96 are mounted uniformly about the transfer housing 84.

A biasing force applied to the actuator rods 78, 82, either singly or together, causes the outer wall 64 of the flexible container 62 to contract in the direction of the transfer housing 84, thereby decreasing the volume of the interior chamber 70. Upon release of the biasing force, the outer wall 64 of the flexible container 62 returns to its unbiased shape, thereby increasing the volume of the interior chamber 70. The repetitive increase and decrease in the volume of interior chamber 70 and the action of the one-way valves 72, which are attached to input fluid connector 74 and output fluid connector 76, provide a pumping action.

In use, the recovery device 13 is placed on the ocean's surface where an oil spill has occurred. The natural wave action of the ocean causes the top surface, comprised of oil and water, to enter into receiving tray(s) 118, 218, 318, 418 (FIG. 6A) and to be collected therein. The natural wave action of the water induces the movement of the collection device(s) 110, 210, 310, 410, however, the first regulator frame 14 dampens the wave action thereby maintaining the receiving tray(s) 118, 218, 318, 418 in a relatively horizontal position in order to collect a mixture of oil and water. Furthermore, the natural wave action of the water produces the forces necessary to operate the pump(s) 22, 22', 24, 24' thereby causing the pump(s) 22, 22', 24, 24', which are in fluid flow communication with the collection device(s) 10, to pump the water and oil mixture from the suction port(s) 120, 220, 320, 420 of the receiving tray(s) 118, 218, 318, 418 to a liquid separator 36 wherein the water and oil are separated and then distributed to appropriate receptacles, such as any suitable storage receptacle.

A liquid separator which is suitable for use in connection with the present invention is that described in U.S. Pat. No. 6,368,498 of Paul L. Guilmette, issued on Apr. 9, 2002 on application Ser. No. 09/650,868, and entitled "Liquid Separator". The disclosure of U.S. Pat. No. 6,368,498 is hereby incorporated herein by reference. The device of U.S. Pat. No. 6,368,498 comprises a housing defining a separation chamber and a liquid inlet for introducing into the separation chamber a mixture of a first and second liquid. First and second liquid outlets are formed in the housing and have, respectively, first and second valves positioned therein to respectively control the flow therethrough of the first and second liquid. The first and second valves include respective closure members which are movable between valve-opening and valve-closing positions. At least one float is contained within the separation chamber and is mounted to translate in a vertical direction therein, the float having a specific gravity between the specific gravities of the first liquid and the second liquid. The mixture of immiscible liquids forms two discrete phases within the separation chamber, the discrete phase of the first liquid having a volume $V_1$, and the discrete phase of the second liquid having a volume $V_2$. There is also a liquid interface between the phases that moves vertically within the separation chamber as determined by the respective volumes of the separated first and second liquids contained therein. Such vertical movement imposed on the float serves to close the second valve when $V_1/V_2$ exceeds a first selected value, and serves to close the first valve when $V_1/V_2$ is below a second selected value, the second selected value being less than the first selected value.

While the invention has been described with reference to a specific embodiment thereof, it will be appreciated that numerous other variations may be made to the illustrated specific embodiment which variations nonetheless lie within the spirit and the scope of the invention.

What is claimed is:

1. A recovery device having a longitudinal axis and a transverse axis and capable of collecting and recovering a floating liquid from the surface of a body of a first liquid on which the recovery device floats, the recovery device comprising:
   (a) one or more collection devices which respectively comprise:
      (i) a body member having a longitudinal axis and a transverse axis;
      (ii) a first regulator frame connected to the body member by a first set of gimbal mounts for pivoting movement of the frame about the longitudinal axis of the flotation member, and
      (iii) a receiving tray having a suction port therein and connected to the regulator frame by a second set of gimbal mounts for pivoting movement of the tray about the transverse axis of the body member, the suction port being connectable to a pump for withdrawing collected liquid from the tray;
   whereby pivoting of the receiving tray relative to the body member induced by movement of the collection device on the body of the first liquid enhances the ability of the receiving tray to contact troughs of waves for flow into the receiving tray, and thence to the suction port, of at least the floating liquid; and (b) one or more pumps having a suction inlet and a discharge outlet, with the suction inlet connected in liquid flow communication to the suction port of the at least one collection device for removing collected liquid from the recovery device.

2. The recovery device of claim 1 comprising a plurality of the collection devices connected to respective ones of a plurality of pumps, the pumps having respective discharge outlets.

3. The recovery device of claim 2 wherein the discharge outlets of the one or more pumps are connected to at least one collection conduit.

4. The recovery device of claim 3 further comprising a liquid separator connected in liquid flow communication to the at least one discharge conduit for receiving the first and second immiscible liquids collected from the recovery device, and separating the collected first and second liquids.

5. The recovery device of claim 4 wherein the liquid separator is dimensioned and configured to separate oil from water and the body member comprises a flotation member which is dimensioned and configured to float on the surface of water within an oil slick floating on the surface of the water.

6. The recovery device of any one of claims 2, 3, 4, or 5 wherein the one or more pumps are dimensioned and configured to be operated by repeated mechanical compression and relaxation of the pumps, and wherein the pumps have first and second actuator means, the first actuator means of a given pump being connected to one of the collection devices, and the second actuator means of the given pump being connected to another of the collection devices, whereby repeated relative movement between respective ones of the collection devices operates the pump.

7. The device of claim 1 wherein at least a portion of the first regulator frame is crenellated.

8. The device of claim 7 wherein the first regulator frame has openings therein which extend about the entire periphery thereof.

9. The device of claim 1 further comprising an intermediate regulator frame which is connected between the first regulator frame and the receiving tray by a first intermediate set of gimbal mounts for pivoting movement of the intermediate regulator frame about the transverse axis of the flotation member.

10. The device of claim 9 wherein the first intermediate set of gimbal mounts is located at the midpoint line of the intermediate regulator frame.

11. The device of claim 9 wherein the first intermediate set of gimbal mounts is located at a position which is off-set from the midpoint line of the intermediate regulator frame.

12. The device of claim 9 wherein the first and second intermediate sets of gimbal mounts are located at the respective midpoint lines of the first regulator frame and the receiving tray.

13. The device of claim 1 wherein a protective grille is carried on the device and is dimensioned and configured to block debris from entering into the suction port.

14. The device of claim 13 wherein the protective grille is comprised of a plurality of substantially parallel linearly extending members whereby a rake may be drawn across the grille to clear therefrom debris accumulated thereon.

15. The device of claim 13 wherein the protective grille is dimensioned and configured to block debris from entering into the receiving tray.

* * * * *